United States Patent
Hayashi et al.

(10) Patent No.: US 6,434,253 B1
(45) Date of Patent: Aug. 13, 2002

(54) DATA PROCESSING APPARATUS AND METHOD AND STORAGE MEDIUM

(75) Inventors: Junichi Hayashi, Kawasaki; Keiichi Iwamura, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/238,570

(22) Filed: Jan. 28, 1999

(30) Foreign Application Priority Data

Jan. 30, 1998 (JP) .......................................... 10-018665
Dec. 28, 1998 (JP) .......................................... 10-372893

(51) Int. Cl.$^7$ ................................................. G06K 9/00
(52) U.S. Cl. ...................................................... 382/100
(58) Field of Search ................................ 382/100, 232, 382/248, 250, 251, 276, 280; 713/176

(56) References Cited

U.S. PATENT DOCUMENTS

| | | | | |
|---|---|---|---|---|
| 5,809,139 A | * | 9/1998 | Girod et al. ................. | 380/202 |
| 6,037,984 A | * | 3/2000 | Isnardi et al. .......... | 375/240.21 |
| 6,061,793 A | * | 5/2000 | Tewfik et al. ................ | 713/176 |
| 6,226,387 B1 | * | 5/2001 | Tewfik et al. ............... | 382/100 |

FOREIGN PATENT DOCUMENTS

| | | | | |
|---|---|---|---|---|
| DE | 4430864 | | 3/1996 | ............ H04B/1/66 |
| EP | 0 096 219 | | 12/1983 | ............ H04N/1/40 |
| WO | WO 97/43736 | | 11/1997 | ............ G06K/9/36 |

OTHER PUBLICATIONS

Sanford et al., "The Data Embedding Method", Proc. of the SPIE, Oct. 23, 1995, vol. 2615, pp. 226–259.
Shapiro, "Embedded Image Coding Using Zerotrees of Wavelet Coefficients," IEEE Trans. Signal Processing, vol. 41, No. 12, 12/93, pp. 3445–3462.
Bors et al., "Image Watermarking Using DCT Domain Constraints", IEEE 1996, pp. 231–234.

* cited by examiner

Primary Examiner—Andrew W. Johns
Assistant Examiner—Shervin Nakhjavan
(74) Attorney, Agent, or Firm—Fitzpatrick, Cella, Harper & Scinto

(57) ABSTRACT

It is an object of this invention to efficiently embed digital watermark information in the above image or audio data. In order to achieve this object, there is provided a data processing apparatus comprising input means for inputting digital data including at least one of image data and audio data, transforming means for transforming a data format of the digital data, compression means for compressing the digital data whose data format has been transformed by the transforming means, and embedding means for embedding digital watermark information in the digital data whose data format has been transformed by the transforming means, wherein the apparatus includes a plurality of image processing modes, compresses the digital data by using the transforming means and the compression means in a first mode, and embeds digital watermark information in the digital data by using the transforming means and the embedding means in a second mode.

17 Claims, 10 Drawing Sheets

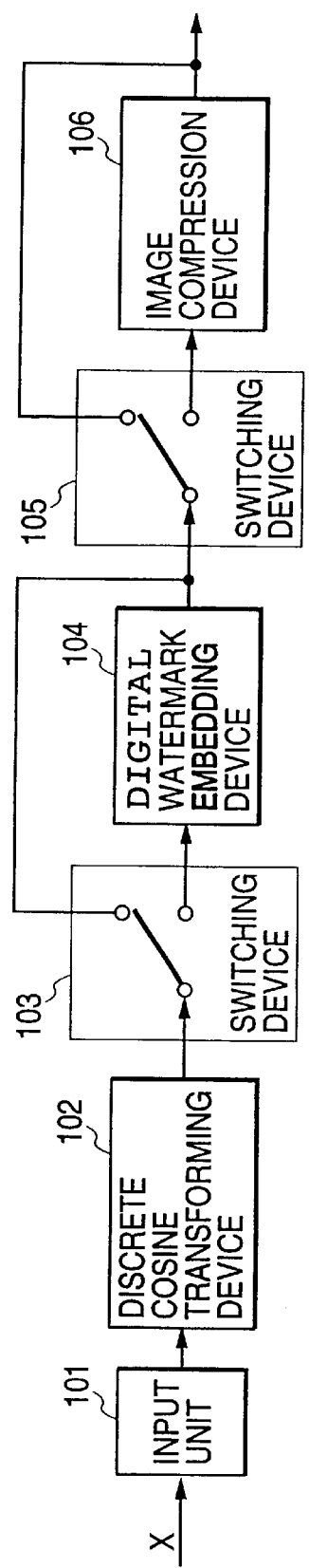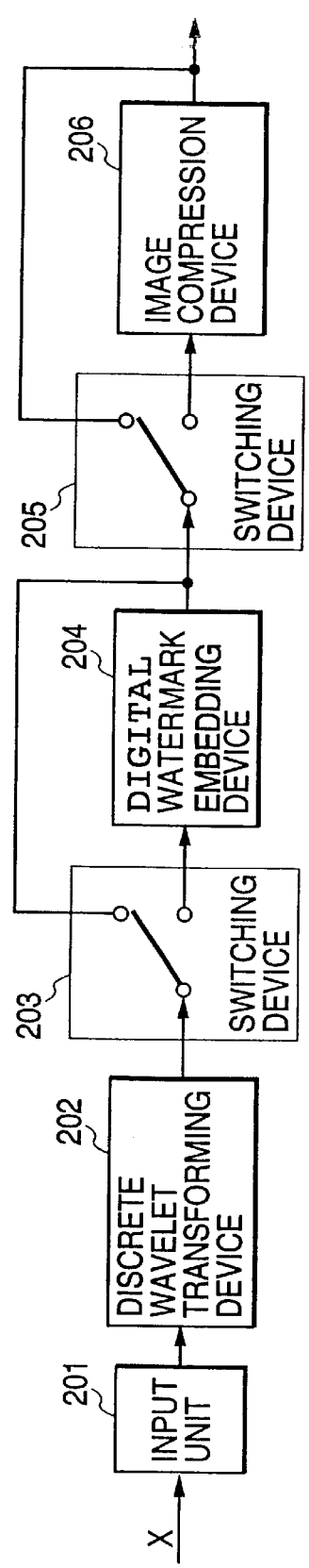

DATA PROCESSING APPARATUS AND METHOD AND STORAGE MEDIUM

BACKGROUND OF THE INVENTION

1. Field of the Invention

The present invention relates to a data processing apparatus and method of embedding or embedding watermark information in image data or audio data and a storage medium storing the method.

2. Related Background Art

With the recent remarkable advances in computers and networks, various types of information, e.g., character data, image data, and audio data, have been handled in networks. As for image data and audio data, relatively large amounts of data are often handled.

Conventionally, therefore, image data and audio data have been compressed to decrease the data amounts. For example, image data is compressed to transmit a large amount of image information through a network.

As the above image compression techniques, the multi-value still image compression scheme (generally called JPEG) in ITU-T recommendation T.81, the binary still image compression scheme (generally called JBIG) in ITU-T recommendation T.82, and the like are known.

Of the above two schemes, the JPEG scheme is suitable for compression of natural images such as photographs. The JBIG scheme is suitable for compression of binary images such as monochrome characters.

Since these image and audio data are digital data, high-definition, high-quality data copies can be easily generated.

In order to protect a copyrights on multimedia data, therefore, copyright information is embedded as digital watermark information in image and audio data.

The copyright information can be obtained by extracting the above digital watermark information from the multimedia data. This allows tracking of an unauthorized copy. As methods of embedding the above digital watermark information in image and audio data, for example, the scheme proposed by National Defence Academy, which uses the discrete Fourier transform, (Onishi, Oka, & Matsui, "Watermark Signature on Image with PN Sequences", SCIS' 9726B, January 1997) and the scheme proposed by Mitsubishi Electric Corp. and Kyushu University, which uses the discrete wavelet transform, (Ishizuka, Sakai, & Sakurai, "Experimental Study on Security and Reliability of Digital Watermarking Technique Using Wavelet Transform", SCIS' 97-26D, January 1997) are known in addition to the scheme proposed by NTT, which uses the discrete cosine transform, (Nakamura, Ogawa, & Takahashi, "Electronic Watermarking Scheme in Frequency Domain for Protection of Copyright on Digital Image", SCIS' 97-26A, January 1997).

Conventionally, compression processing for image and audio data and digital watermark information embedding processing are independently performed. For example, digital watermark information is embedded in original data first, and then compression processing is performed upon completion of the embedding processing. For this reason, means for executing the respective processes are independently prepared. The overall size of the apparatus having these two means becomes inevitably large.

SUMMARY OF THE INVENTION

The present invention has been made to solve the above problems, and has as its principal object to efficiently embed digital watermark information in image or audio data.

More specifically, it is an object of the present invention to efficiently arrange both an image or audio data compression processing unit and an digital watermark information embedding unit in one apparatus.

In order to achieve the above objects, according to a preferred embodiment of the present invention, there is provided a data processing apparatus comprising input means for inputting digital data including at least one of image data and audio data, transforming means for transforming a data format of the digital data, compression means for compressing the digital data whose data format has been transformed by the transforming means, and embedding means for embedding digital watermark information in the digital data whose data format has been transformed by the transforming means, wherein the apparatus includes a plurality of image processing modes, compresses the digital data by using the transforming means and the compression means in a first mode, and embeds digital watermark information in the digital data by using the transforming means and the embedding means in a second mode.

It is another object of the present invention to embed digital watermark information in image data by an optimal method in accordance with the type of image data.

In order to achieve the above object, according to a preferred embodiment of the present invention, in the apparatus, the compression means includes quantization means for quantizing the digital data whose data format has been transformed by the transforming means and entropy coding means for performing entropy coding of the quantized data.

It is still another object of the present invention to properly set the sequence of compression of image or audio data and embedding of digital watermark information in the data.

In order to achieve the above object, according to a preferred embodiment of the present invention, in the apparatus, the compression means includes quantization means for quantizing the digital data whose data format has been transformed by the transforming means, and entropy coding means for performing entropy coding of the quantized data.

The above and other objects, features, and advantages of the present invention will be apparent from the following detailed description in conjunction with the accompanying drawings and the appended claims.

BRIEF DESCRIPTION OF THE DRAWINGS

FIG. 1 is a block diagram showing an apparatus applied to the first embodiment of the present invention;

FIG. 2 is a block diagram showing an apparatus applied to the second embodiment of the present invention;

DETAILED DESCRIPTION OF THE PREFERRED EMBODIMENTS

Figure 3:
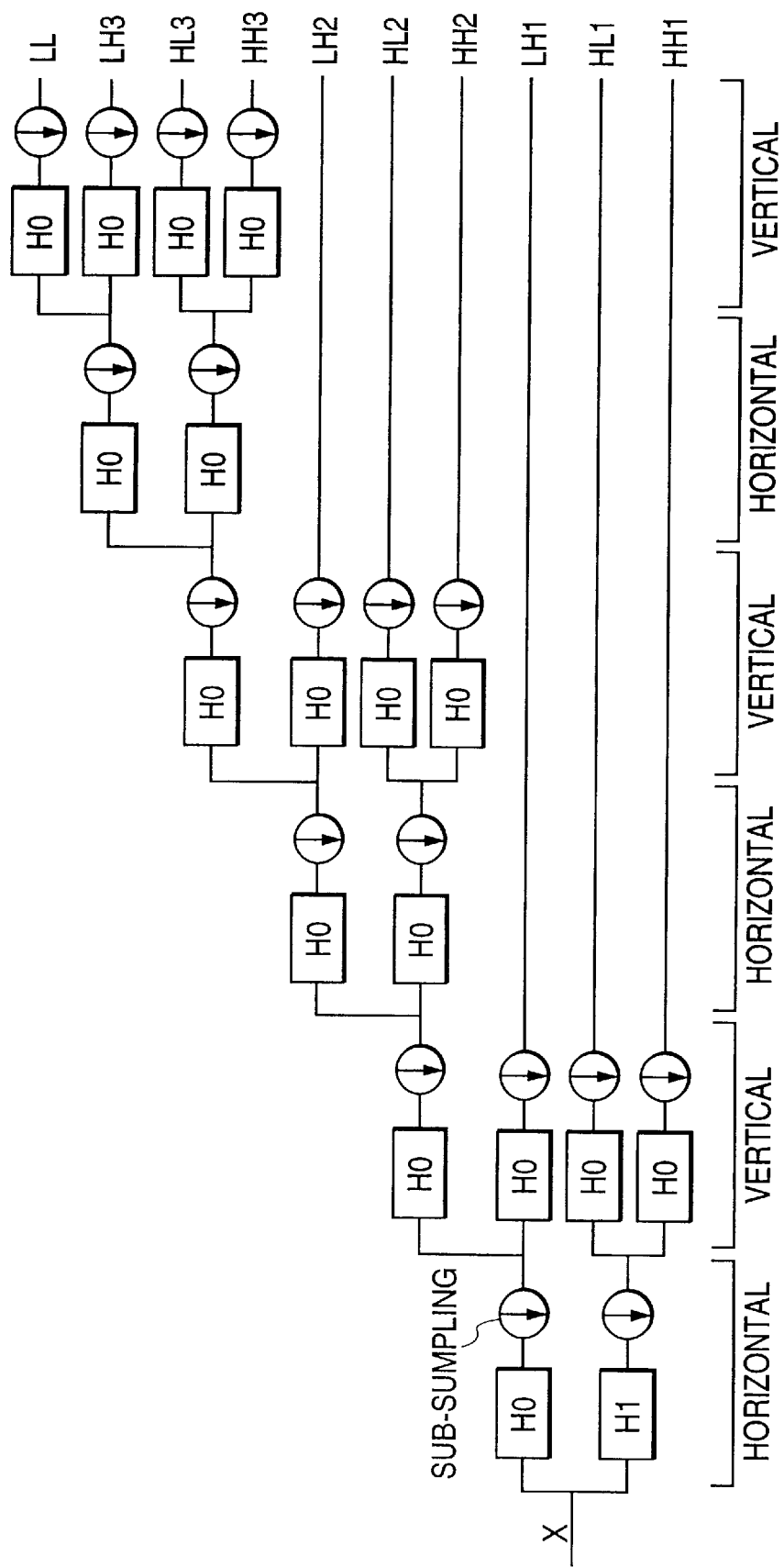
FIG. 3 is a view for explaining the discrete wavelet transform.

The preferred embodiments of the present invention will be sequentially described below.

[First Embodiment]

FIG. 1 shows the schematic arrangement of an image processing apparatus used in the first embodiment of the present invention.

The flow of processing in the respective components will be briefly described first. Referring to FIG. 1, image data x input from an input unit 101 is multivalue image data having a predetermined number of bits per pixel. In this embodiment, this data is expressed by 8 bits (256 levels of gray) per pixel. That is, the data represents a monochrome image. Note that the present invention is not limited to the method of this embodiment, and also includes, for example, a method of processing color multivalue image data consisting of 8-bit R, G, and B data in units of color components. The multivalue image data x input through the input unit 101 is subjected to predetermined transform processing in a discrete cosine transforming device 102.

For example, the discrete cosine transforming device 102 can perform the discrete cosine transform for input multivalue image data x to break up the data into a plurality of frequency components. In the discrete cosine transform, the image expressed by the input multivalue image data x is first segmented into a plurality of blocks that do not overlap, and the DCTs are calculated in units of blocks. In this embodiment, one block is composed of 8×8 pixels. In addition, the coefficients obtained after the transform are also expressed in blocks each consisting of 8×8 coefficients. One coefficient of each block which corresponds to the lowest-frequency component is called a DC component, and the 63 remaining coefficients are called AC components.

The discrete cosine transform can be executed by:

$$Xi(u,v)=2/NC(u)C(v)\Sigma u\Sigma vxi(m,n)\cos((2m+1)u\pi/(2\ N))\cos(((2n+1)v\pi)/(2N)) \quad (1)$$

for $C(p)=1/\sqrt{2}$ when $p=0$, and $C(p)=1$ when $p\neq 0$.

For example, since a natural image has many low-frequency signal components, important signals can be concentrated on low-frequency components by the discrete cosine transform. On the subsequent stage, therefore, any deterioration in image quality is suppressed if processing that influences only high-frequency components and minimizes loss of low-frequency components is done.

The transform coefficients (frequency components) obtained after the DCT performed by the discrete cosine transforming device 102 are input to an digital watermark embedding device 104 through a switching device 103. The digital watermark embedding device 104 manipulates the values of the respective transform coefficients obtained by the discrete cosine transform to output new coefficients in which digital watermark information is embedded.

As an example of an digital watermark information embedding method using this discrete cosine transform, the following method can be used. First of all, input multivalue image data is divided into square blocks, and the coefficients obtained by calculating the discrete cosine transform for each block are used as input data to the digital watermark embedding device 104. One discrete cosine transform coefficient (frequency component) is then selected from each block. One embedding bit is embedded in only this coefficient as follows.

As a coefficient (frequency component) to be embedded, a coefficient corresponding to a relatively-low-frequency component is randomly selected from the components of each block excluding the DC component (lowest-frequency component). One embedding bit is embedded by special quantization for the selected coefficient.

In this watermark information (embedding bit) embedding method, the size of quantization step to be used corresponds to the embedding strength. Note that the embedding strength indicates the degree to which watermark information embedded in data remains unlost when the data is edited somehow. For example, "0" or "1" as digital watermark information (embedding bit) is embedded in one coefficient of each block in accordance with the following rule. In this embodiment, 1-bit information is embedded in each block.

First of all, quantizing $s\_\{u\_0v\_0\}$ yields a value q given by $$q=<<s\_\{u\_0v\_0\}/h>>h \quad (2)$$

where $s\_\{u\_0v\_0\}$ is the coefficient input from the discrete cosine transforming device 102, h is the embedding strength, and $<<x>>$ is the maximum coefficient that does not exceed x.

If bit=0, then $c=q+ht+q/4$

If bit=1, then $c=q+ht+3q/4$ \quad (3)

where t is the coefficient obtained by obtaining one of natural numbers c which is nearest to $s\_\{u\_0v\_0\}$ and embedding watermark information.

In this case, an initial value to be input to a random number generator to specify the coefficient subjected to embedding and the value of the quantization step are key factors.

The coefficients processed by the digital watermark embedding device 104 are input to an image compression device 106. The image compression device 106 includes coding units located on the subsequent stage and based on various compression schemes, e.g., a coding unit that operates using the transform coefficients obtained by performing the discrete cosine transform for original image data. For example, this device includes a quantizer for executing JPEG compression and a Huffman coder. Note that this quantizer performs quantization different from special quantization performed by the digital watermark embedding device 104.

The level of each input coefficient is expressed by a discrete value by the quantizer in the image compression device 106. In this quantization, the quantized value of a coefficient corresponding to a low-frequency component is expressed by a large number of bits, whereas the quantized value of a coefficient corresponding to a high-frequency component is expressed by using a small number of bits.

Efficient compression with consideration given to human vision can be performed by selective quantization using proper numbers of bits in accordance with the frequencies of frequency components in the above manner.

The Huffman coder in the image compression device 106 is one of the entropy coders. This coder generates variable-length codes. More specifically, a long code word is assigned to an input value with a low occurrence probability, and a short-code word is assigned to an input value with a high occurrence probability. This can shorten the average code word length.

In this embodiment, the switching device 103 may be used to perform switching so as to skip the digital watermark embedding device 104, or a switching device 105 may be used to perform switching so as to skip the image compression device 106. With this switching operation, only image compression processing or digital watermark information embedding processing can be performed.

As shown in FIG. 1, in this integral apparatus, the discrete cosine transforming device 102 is commonly used for digital watermark information embedding processing and image compression processing, unlike a general arrangement requiring two discrete cosine transforming devices. This allows efficient mounting of components. More specifically, if these components (the digital watermark embedding device 104, the image compression device 106, and the discrete cosine transforming device 102) are integrally mounted on one image processing board to be inseparable, the circuit size can be decreased. Although the digital watermark embedding device 104 is placed before the image compression device 106 in this embodiment, their positions can be interchanged.

[Second Embodiment]

FIG. 2 schematically shows an image processing apparatus according to the second embodiment of the present invention.

The flow of processing in the respective components will be described first.

Referring to FIG. 2, image data x input from an input unit 201 is multivalue image data having a predetermined number of bits per pixel. The input multivalue image data x is subjected to predetermined transform processing in a discrete wavelet transforming device 202.

The discrete wavelet transforming device 202 outputs the transform coefficients obtained by dividing the input multivalue image data x into a plurality of frequency bands. This transform processing will be described in detail later. The transform coefficients obtained by the transform performed by the discrete wavelet transforming device 202 are input to an digital watermark embedding device 204.

The digital watermark embedding device 204 manipulates some of the values of the transform coefficients obtained by the discrete wavelet transform to output coefficients in which digital watermark information is embedded. This digital watermark information embedding processing will be described later.

The coefficients processed by the digital watermark embedding device 204 are input to an image compression device 206. This image compression processing will also be described later.

In this embodiment, a switching device 203 may be used to perform switching so as to skip the digital watermark embedding device 204, or a switching device 205 may be used to perform switching so as to skip the image compression device 206. With this switching operation, only image compression processing or digital watermark information embedding processing can be performed.

As shown in FIG. 2, according to this embodiment, in the data processing apparatus for performing digital watermark information embedding and image compression, the discrete wavelet transforming device 202 is commonly used for these processes, unlike a general arrangement requiring two discrete wavelet transforming devices. This allows efficient mounting of components.

The operation of each block will be described in detail next with reference to FIG. 3.

The operation of the discrete wavelet transforming device 202 will be described in detail first.

The discrete wavelet transforming device 202 performs the discrete wavelet transform for input multivalue image data x to divide the data into a plurality of frequency bands (to be referred to as subbands hereinafter).

Figure 4:
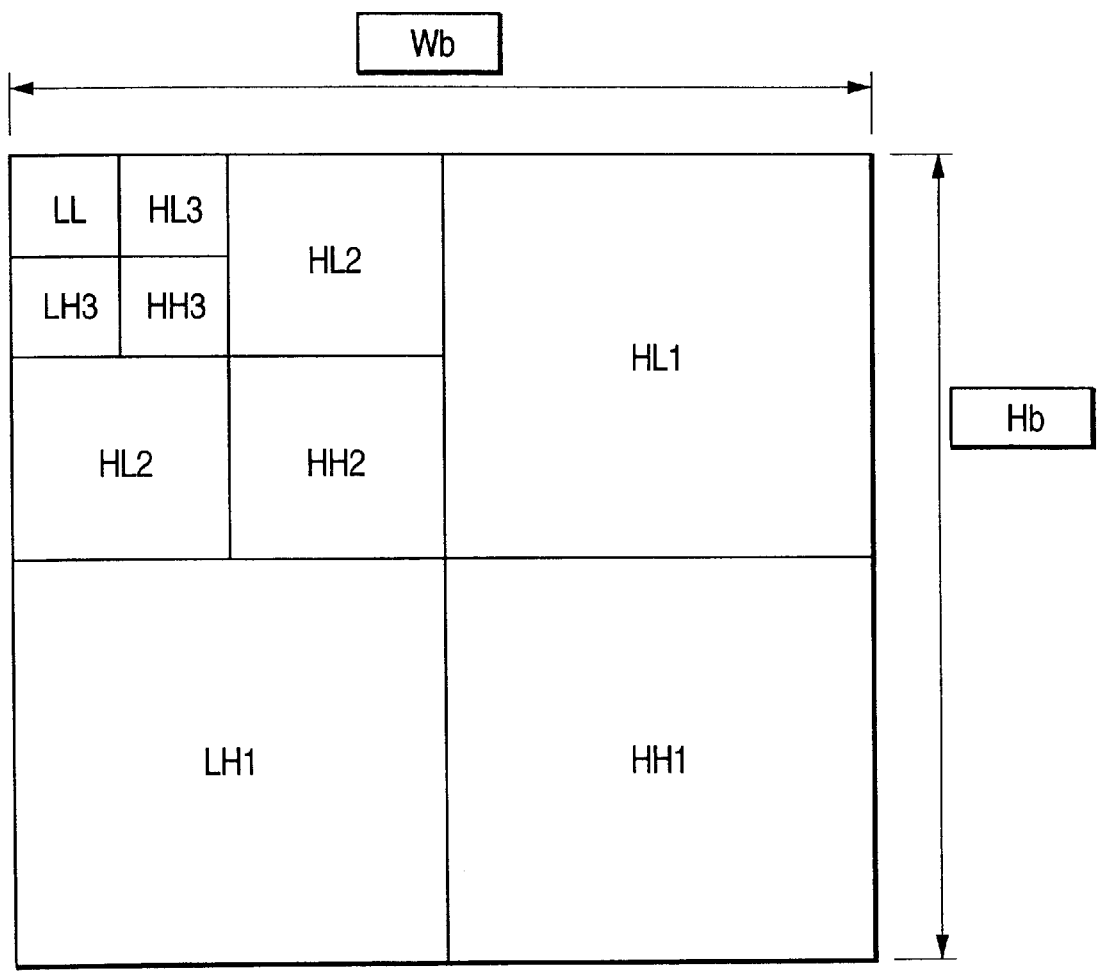
FIG. 4 is a diagram showing subbands obtained by a discrete wavelet transforming device.

FIG. 3 is a schematic view showing how discrete wavelet transform is executed. FIG. 4 is a diagram of subbands generated by this transform processing.

Referring to FIG. 2, the input multivalue image data x passes through low-pass filters H0 and a high-pass filter H1 in the horizontal and vertical directions, as shown in FIG. 3, and sampling is performed every time the data passes through one of the filters. As a result, the data is broken up into a plurality of frequency bands.

FIG. 4 shows the result obtained by transforming multivalue image data x corresponding Wb pixels (horizontal)× Hb pixels (vertical) in three steps. In this embodiment, the size of the block in FIG. 4 corresponds to the size (Wb×Hb) of each block image obtained by the block dividing device.

For example, a result r obtained by filtering the multivalue image data x through the low-pass filters H0 and sub-sampling it is expressed by equation (4) below. A result d obtained by filtering the data through the high-pass filter H1 and sampling it is expressed by equation (5).

$$r(n)=<<(x(2n)+x(2n+1))/2>> \quad (4)$$

$$d(n)=x(2n+2)-x(2n+3)+<<(-r(n)+r(n+2)+2)/4>> \quad (5)$$

where $<<x>>$ is a maximum integer that does not exceed

As shown in FIG. 3, the discrete wavelet transforming device 202 sequentially repeats filtering and sub-sampling in the horizontal and vertical directions in this manner to sequentially divide each input block image into a plurality of subbands.

FIG. 4 shows the names of the respective subbands obtained in FIG. 3 and their spatial position relationship. Each subband contains a corresponding transform coefficient (frequency component).

The digital watermark embedding device 204 embeds digital watermark information by manipulating each coefficient having undergone the discrete wavelet transform. In this case, digital watermark information needs to be invisible to the human eye and robust against image compression and the like.

As an example of the embedding processing performed by the digital watermark embedding device 204, the processing based on the following scheme (Matsui, Onishi, & Nakamura, "Embedding of Signature Data in Image in Wavelet Transform", Singakuron D-II, Vol. J79-D-II, No. 6 pp. 1017–1024, June 1996) can be used.

According to this scheme, three types of multi resolution expressions obtained by the wavelet transform are expressed by vectors, and places in which digital watermark information is embedded are specified by using these vectors.

Embedding is realized by replacing several lower bits of selected wavelet coefficients with embedding information. As the image compression device 206, one of devices based on various compression schemes that uses coefficients having undergone the discrete wavelet transform can be exploited. As an example of the image compression device 206, one of devices based on the EZW scheme (to be described next) proposed by Shapiro (Jerome M. Shapiro, "Embedded Image Using Zerotrees of Coefficients", IEEE Trans, ON SIGNAL PROCESSING, VOL 41, NO. 12, December 1993), the SPIHT scheme proposed by Said (Air Said & William A. Pearlman, "A New Fast and Efficient Image Codec Based on Set Partitioning in Hierarchical Trees", IEEE Int. Symp. on Circuits and System. IL. May 1993), and the like can be conceived.

The EZW and SPIHT schemes use a data structure called a zerotree. In this case, the zerotree is a set of coefficients that are located at the same spatial positions in the respective subbands obtained by the discrete wavelet transform and expressed as a tree structure.

Wavelet transform coefficients representing a natural image uses the property that if the coefficients in lower-frequency subbands are invalid in this tree structure, all the coefficients in higher-frequency subbands in the same tree structure are invalid.

In this embodiment, the digital watermark information embedding scheme is not limited to the above scheme proposed by Matsui and the EZW and SPIHT schemes as examples of the image compression apparatus. Any digital watermark information embedding apparatus using discrete wavelet transform and any image compression apparatus can be applied to this embodiment. As in the first embodiment, in this second embodiment, the positions of the digital watermark embedding device and the image compression device can be interchanged.

[Third Embodiment]

Figure 5:
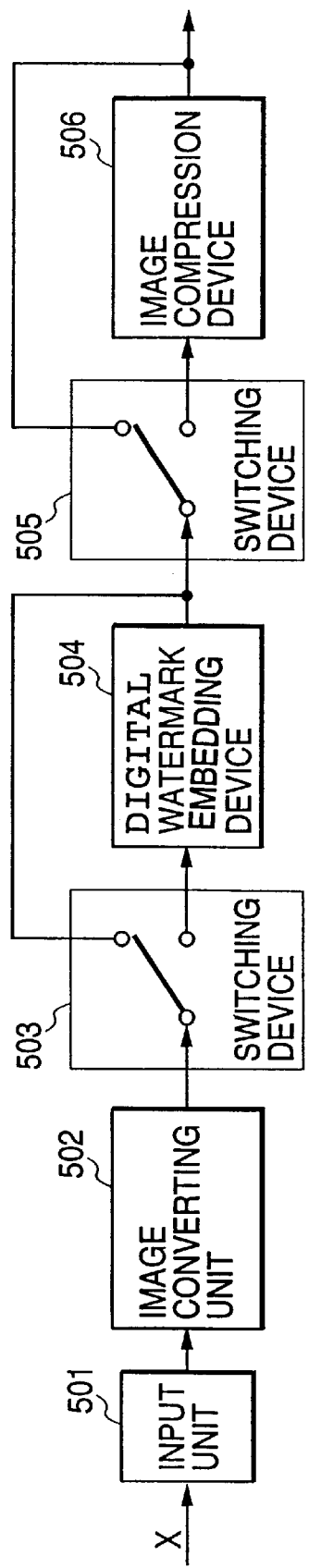
FIG. 5 is a block diagram showing an apparatus applied to the third embodiment of the present invention.

FIG. 5 is a schematic view showing an image processing apparatus used in the third embodiment of the present invention. In this embodiment, the discrete cosine transforming device 102 in the first embodiment or the discrete wavelet transforming device 202 in the second embodiment is replaced with an image converting unit 502. The remaining constituent elements, i.e., an input unit 501 and a switching device 503 correspond to the input unit 101 and the switching device 103 in FIG. 1, respectively. In addition, an digital watermark embedding device 504, a switching device 505, and an image compression device 506 correspond to the digital watermark embedding device 104, the switching device 105, and the image compression device 106, respectively.

As the above image converting unit 502, various converting units as well as a discrete cosine converting unit and a discrete wavelet converting unit can be used. This image converting unit 502 is combined with the image compression device 506 placed after the unit 502 to code input multivalue image data x. This arrangement can solve, for example, the problems of large overall size of the image processing apparatus and low utilization efficiency of the circuit. As this image converting unit 502, for example, various converting units including a discrete Fourier transforming device and a prediction converting unit can be used.

[Fourth Embodiment]

Figure 6:
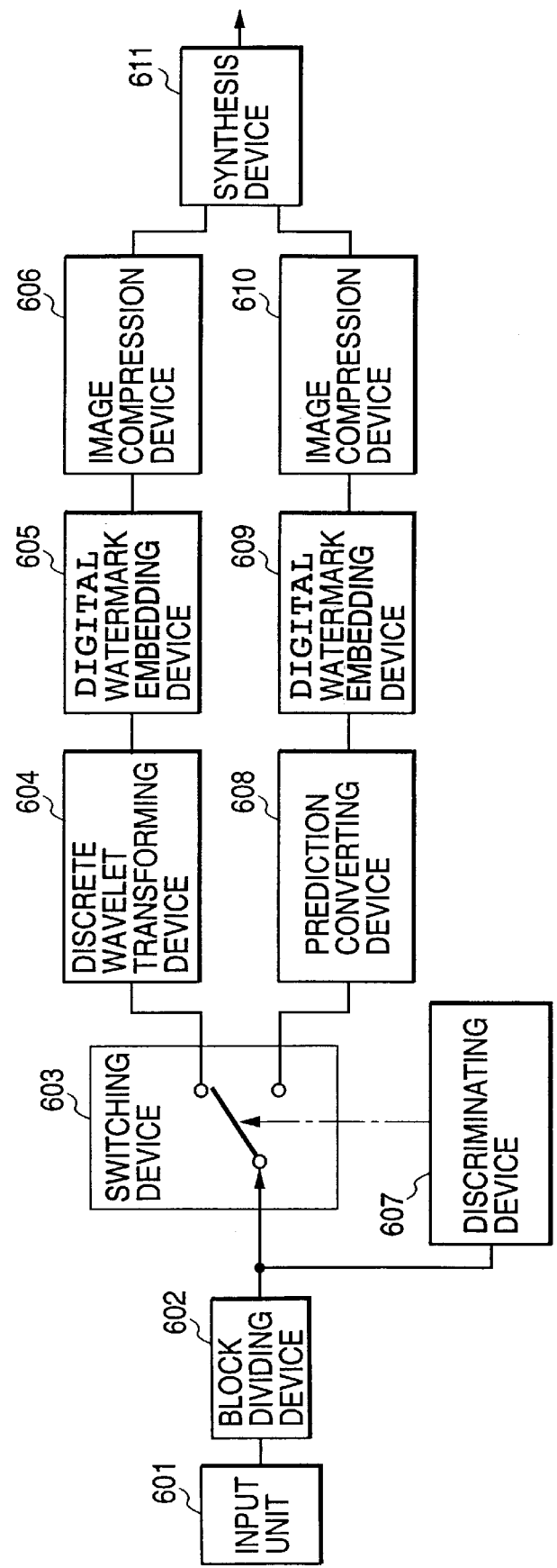
FIG. 6 is a block diagram showing an apparatus applied to the fourth embodiment of the present invention.

FIG. 6 shows the schematic arrangement of an image processing apparatus according to the fourth embodiment of the present invention. Referring to FIG. 6, the image data input from an input unit 601 is multivalue image data having a predetermined number of bits per pixel.

This input image data includes both image data to be expressed by M values and image data to be expressed by N (N<M) values.

An example of the image data to be expressed by M values is image data representing a photograph, painting, or the like suitable for a multivalue expression. This data is generally expressed in 256 levels of gray with a depth of 8 bits per pixel.

An example of the image data to be expressed by N values (N<M) is image data representing a character to be expressed by a binary value, a line drawing, or the like. This data is generally expressed in 2 levels of gray with a depth of 1 bit per pixel.

In this embodiment, to embed digital watermark information in image data representing an image including such images by using the characteristics of multivalue and binary image data, digital watermark information is embedded in the former image as multivalue image data, and digital watermark information is embedded in the latter image as binary image data, thus efficiently embedding the digital watermark information in the overall image.

Each block will be described in detail next.

Figure 7:
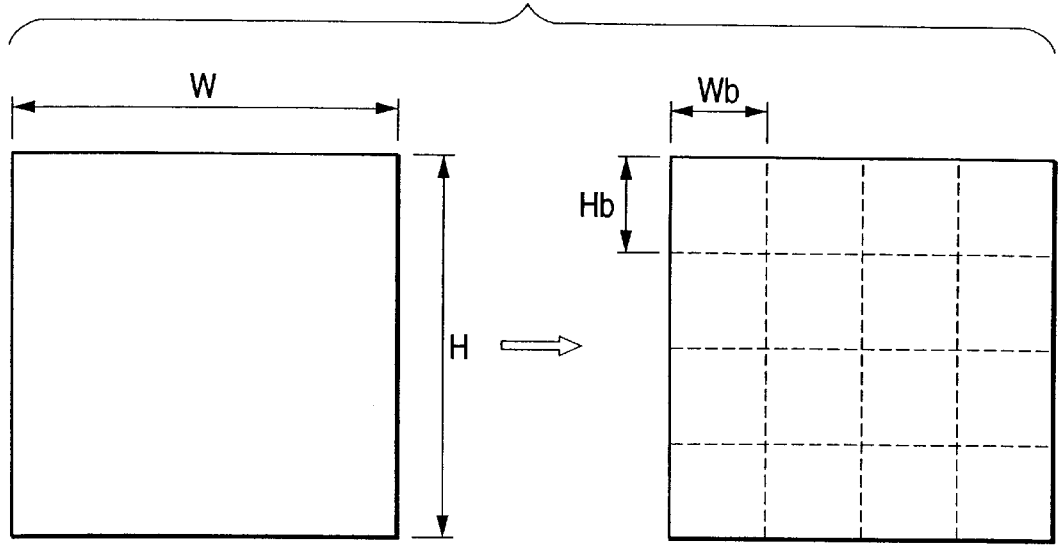
FIG. 7 is a view for explaining a block dividing device 602.

A block dividing device 602 divides input multivalue image data (W pixels (horizontal)×H pixels (vertical)) into blocks each having a predetermined size. The multivalue image data is sequentially output in units of blocks. In this case, assume that multivalue image data divided into rectangular areas each having a size of Hb pixels (horizontal)× Wb pixels (vertical) is output, as shown in FIG. 7.

A discriminating device 607 checks each bit of the input multivalue image data to discriminate whether this multivalue image data is to be expressed as a binary image (character, line drawing, or the like) or as a multivalue image (natural image such as a photograph or painting).

Figure 8:
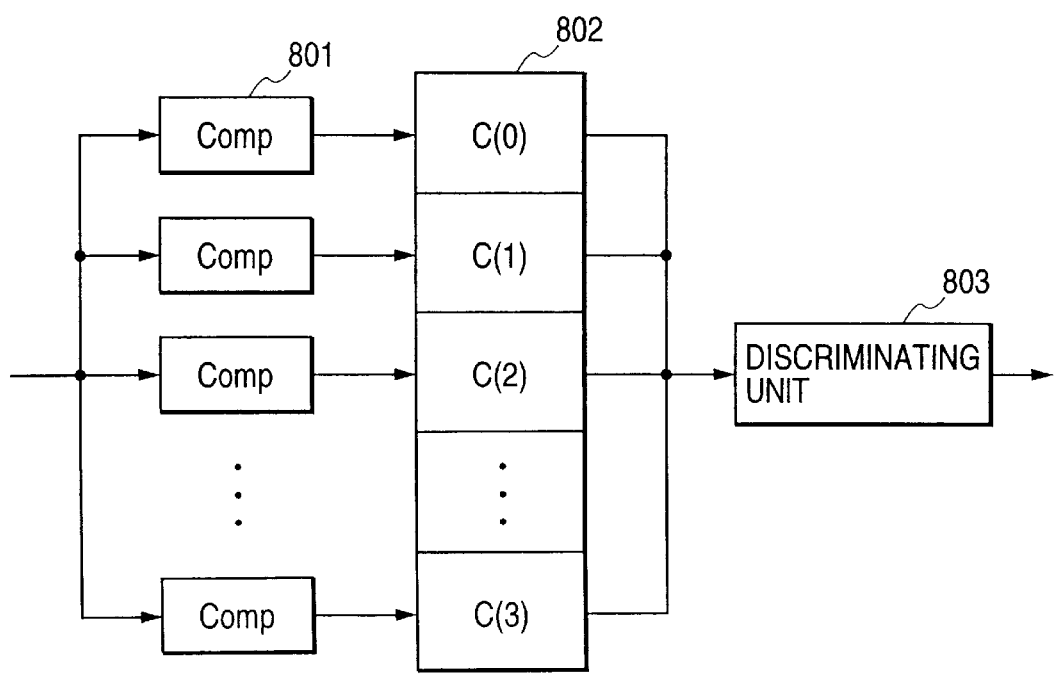
FIG. 8 is a view for explaining a discriminating device 607.

FIG. 8 is a view showing the operation of the discriminating device 607. The input image data is compared with a reference value by a comparator 801. The result is input to a counter array 802.

In this case, each reference value set in the comparator 801 corresponds to each pixel value of the input multivalue image data. A number L of reference values is set to be qual to the maximum number of levels (e.g. 256) that can be expected for the multivalue image data.

If the comparison result indicates that each pixel value of the input image data is equal to a corresponding reference value, the comparator 801 outputs "1", and the result is input to the corresponding counter of the counter array 802.

Meanwhile, each pixel of the image data input to the comparator 801 is counted. When all the pixels of the block have undergone comparison processing, the contents of the counter array 802 are output to a discriminating unit 803, and the contents of the counter array 802 are reset.

The discriminating unit 803 scans the contents of the respective counters C(i), and counts a number NC of counters represented by $$c(i) \neq 0 (i=0 \ldots L-1) \quad (6)$$

If $$NC=2 \quad (7)$$

then, it is discriminated that this image data should be expressed as a binary image.

if $$NC>2 \quad (8)$$

then, it is discriminated that this image data should be expressed as a multivalue image.

This discrimination result is output to a switching device 603. If it is determined on the basis of the discrimination result input from the discriminating unit 803 that the input multivalue image data should be expressed as a multivalue image, the switching device 603 operates to output the data to a discrete wavelet converting unit 604. If it is determined that the input image data x should be expressed as a binary image, the switching device 603 operates to output the data to the prediction converting unit 608.

Subsequently, each block determined as a multivalue image is subjected to the discrete wavelet transform in the discrete wavelet converting unit 604. An digital watermark embedding device 605 embeds digital watermark information in the block. An image compression device 606 performs quantization and entropy coding for the block, thereby compressing the image. The resultant data is supplied to a synthesis device 611.

Each block determined as a binary image is subjected to prediction coding in the prediction converting unit 608. Digital watermark information is embedded in the resultant data by an digital watermark embedding device 609. An image compression device 610 then executes quantization and entropy coding for the data to compress the image. The resultant data is supplied to the synthesis device 611.

The synthesis device 611 places the blocks determined as multivalue and binary images and corresponding to one frame at positions corresponding to the respective blocks of one frame of the original image, thereby generating a one-frame image having undergone digital watermark information embedding and image compression.

Note that the present invention is not limited to the combination of the discrete wavelet converting unit 604 and prediction converting unit 608 described in this embodiment. For example, a combination of the methods of the first, second, and third embodiments, like the one shown in FIG. 9, also falls within the spirit and scope of the present invention. An example of this arrangement will be described below.

Figure 9:
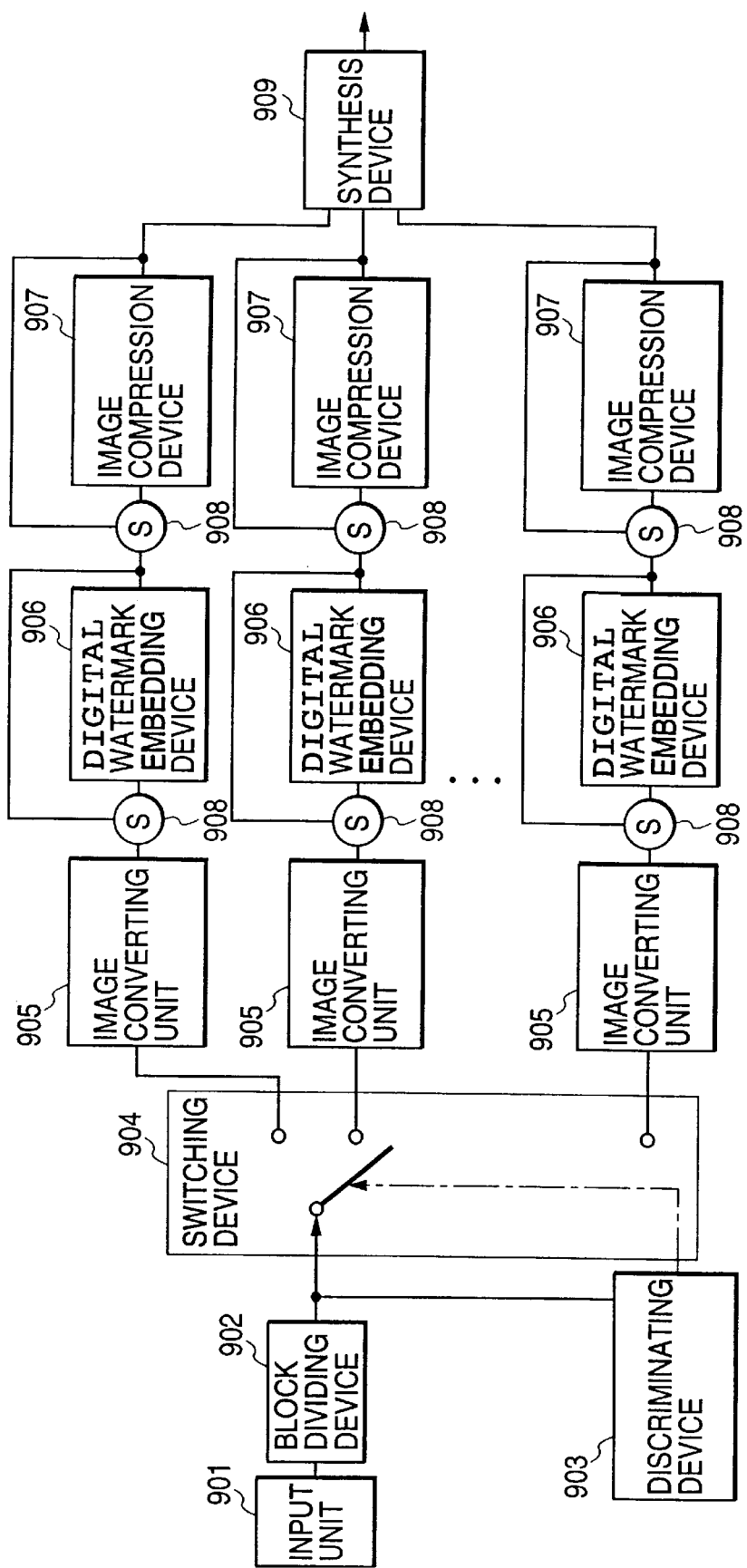
FIG. 9 is a block diagram for explaining a combination of a plurality of embodiments.

Referring to FIG. 9, this arrangement includes an input unit 901, a block dividing device 902, a discriminating device 903, a switching device 904, an image converting unit 905, an digital watermark embedding device 906, an image compression device 907, a switching device 908, and a synthesis device 909. The image converting unit, the digital watermark embedding device, an the image compression device of each embodiment are applied to each data path in FIG. 9. These combinations of the components are adaptively switched in accordance with each one-frame image or each block to implement efficient digital watermark information embedding and image compression.

[Fifth Embodiment]

Figure 10:
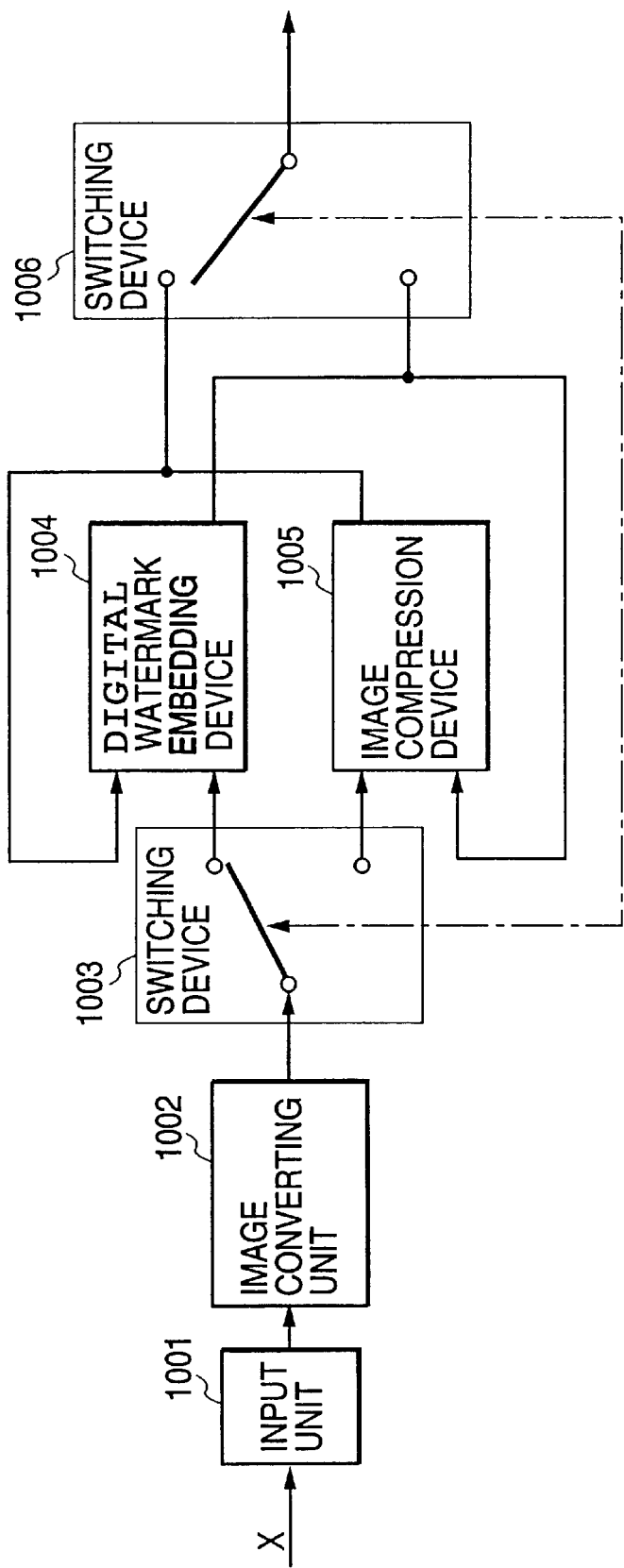
FIG. 10 is a block diagram applied to the fifth embodiment of the present invention.

FIG. 10 shows the schematic arrangement of an image processing apparatus according to the fifth embodiment of the present invention.

The flow of processing in the respective components will be described first.

Referring to FIG. 10, image data x input from an input unit 1001 is multivalue image data having a predetermined number of bits per pixel (8 bits per pixel in this embodiment).

The multivalue image data x input through the input unit 1001 is input to an image converting unit 1002. As the image converting unit 1002, a device based on the discrete wavelet transform, discrete cosine transform, discrete Fourier transform, or the like can be used.

The output from the image converting unit 1002 is input to a switching device 1003. The use of theswitching device 1003 allows arbitrary selection of the sequence of digital watermark information embedding and image compression.

The output from the switching device 1003 is input to an digital watermark embedding device 1004 or image compression device 1005. The processing in each device can be performed by using the discrete cosine transform and discrete wavelet transform, as described above.

Subsequently, the output from the digital watermark embedding device 1004 is input to the image compression device 1005 and a switching device 1006. The output from the image compression device 1005 is input to the digital watermark embedding device 1004 and the switching device 1006. The respective outputs are adaptively switched and output from the switching device 1006 controlled by a switch from the-switching device 1003.

For example, the output from the image converting unit 1002 is supplied to the digital watermark embedding device 1004 through the switching device 1003. The digital watermark embedding device 1004 embeds digital watermark information in the image data. Thereafter, the image compression device 1005 executes quantization and entropy coding for the data to compress the image. The coded data is then output through the switching device 1006.

If the data is supplied from the switching device 1003 to the image compression device 1005, image compression is executed by the image compression device 1005. Thereafter, digital watermark information is embedded in the data by the digital watermark embedding device 1004. The resultant data is output through the switching device 1006.

The output from the image converting unit 1002 can be supplied to the image compression device 1005 through the switching device 1003. The image compression device 1005 executes image compression. The resultant data can be output through the switching device 1006.

In addition, the output from the image converting unit 1002 can be supplied to the digital watermark embedding device 1004 through the switching device 1003. After digital watermark information is embedded in the data by the digital watermark embedding device 1004, the resultant data can be output through the switching device 1006.

By using the image processing apparatus of this embodiment, digital watermark information embedding processing and image compression processing can be. selectively executed in an arbitrary sequence.

In addition, according to this embodiment, the present invention can be implemented by using various image converting units by replacing the arrangement shown in FIG. 9 constituted by the image converting unit, the image compression device, and the digital watermark embedding device with the arrangement of the apparatus shown in FIG. 10.

[Sixth Embodiment]

Figure 11:
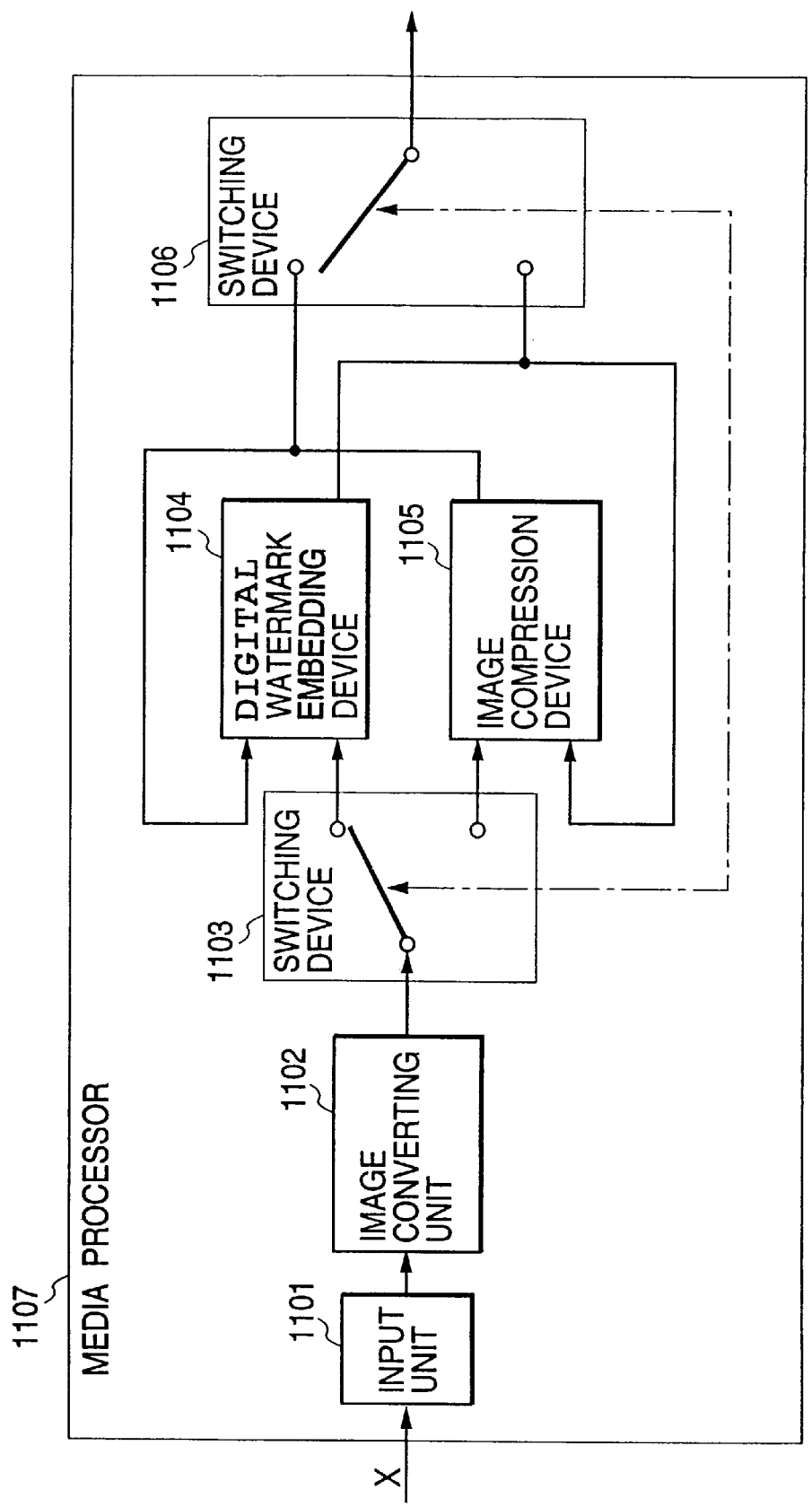
FIG. 11 is a block diagram showing a state in which a block in FIG. 10 is implemented by a media processor.
Figure 12:
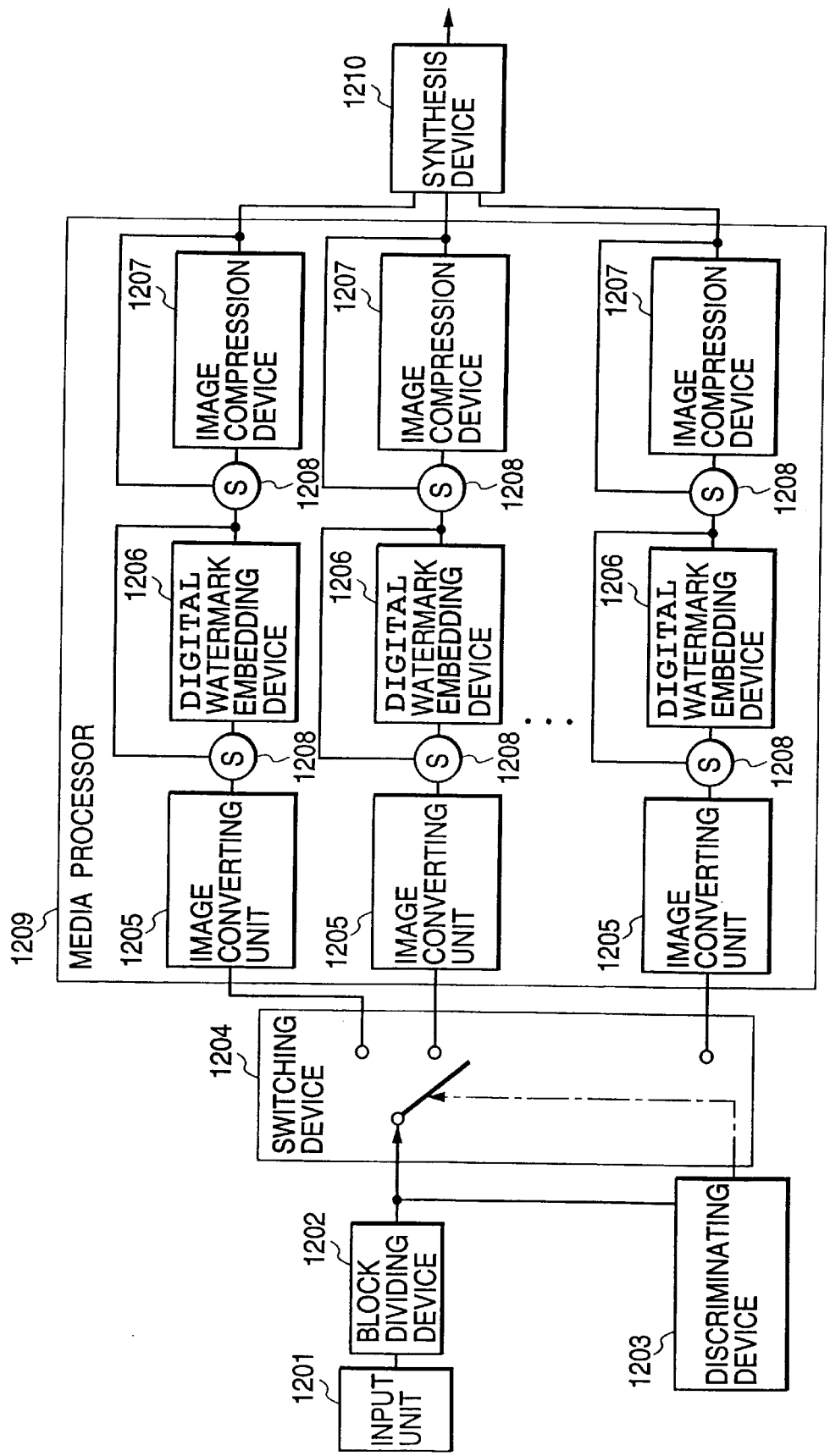
FIG. 12 is a block diagram showing a state in which a block in FIG. 9 is implemented by a media processor.

FIGS. 11 and 12 schematically show an image processing apparatus used in the seventh embodiment of the present invention.

The image processing apparatus of this embodiment is an example of the apparatus obtained by applying a media processor to each embodiment described above. The media processor is a programmable digital signal processing processor having an optimal internal structure for image processing and communication processing.

By using the media processor, the number of processes that can be concurrently processed is increased, thus allowing parallel processing of a large amount of data.

In addition, since the processing performed by this media processing is written in a program, when the processing performed by the medial processor is to be changed, it can be easily and flexibly changed by rewriting the program.

The design techniques used for the media processor mainly include a parallel processing technique that improves the processing performance in performing the same operation, a parallel processing technique that improves the processing performance in performing a plurality of different operations, and a specifying technique that improves the efficiency of specific operation.

Processes such as the discrete cosine transform, discrete Fourier transform, and discrete wavelet transform used by the image converting unit used in this embodiment are performed by repeating simple arithmetic operation such as calculation of the sum of products. That is, the design techniques used for the media processor can be effectively used.

FIG. 11 shows the arrangement of the image processing apparatus of this embodiment which uses the media processor. A high-speed apparatus with high flexibility can be implemented by describing the switching operation for the digital watermark embedding device and the image compression device in a program.

In addition, if media processors that include the functions of an digital watermark embedding device 1104 and image compression device 1105 and can be switched are arranged in parallel or the overall arrangement having these devices arranged in parallel is implemented by using one media processor as shown in FIG. 12, the overall apparatus can be simplified, increased in speed, and improved in flexibility.

Referring to FIG. 11, this arrangement includes an input unit 1101, an image converting unit 1102, a switching device 1103, the digital watermark embedding device 1104, the image compression device 1105, and a switching device 1106.

Referring to FIG. 12, this arrangement includes an input unit 1201, a block dividing device 1202, a discriminating device 1203, a switching device 1204, an image converting unit 1205, an digital watermark embedding device 1206, an image compression device 1207, a switching device 1208, a media processor 1209, and a synthesis device 1210.

In this case, the overall image processing apparatus need not be implemented by one media processor. An arrangement in which an image processing apparatus is partially implemented by a media processor and an arrangement in which time-divisional processing is performed by using a plurality of media processors fall within the spirit and scope of the present invention.

Not that the present invention can be applied to every case in which this media processor is applied to at least some of the conversion means, compression means, embedding means, discriminating means, and the like in each embodiment.

(Another Embodiment)

The present invention is not limited to the above apparatus and method which realize each embodiment described above and a combination of the methods of the respective embodiments. The objects of the present invention are also achieved by supplying a program code of software that can realize the above embodiments to the computer (CPU or MPU) in the system or apparatus, and making the computer in the system or apparatus operate the respective devices in accordance with the program code.

In this case, since the program code itself realizes the functions of the above embodiments, the program code itself and a means for supplying the program code to the computer, and more specifically, a storage medium storing the program code constitute the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

This program code constitutes the present invention not only in a case in which the functions of the above embodiments are realized by making the computer control the respective devices in accordance with only the supplied program code but also in a case in which the functions are realized by the program code in cooperation with an OS (operating system) running on the computer, another application software, or the like.

Furthermore, the present invention includes a case in which this supplied program code is stored in a memory in a function extension board of the computer or a function extension unit connected to the computer, and some or all of actual processing operations are executed by a CPU or the like arranged in the function extension board or function extension unit on the basis of the instructions of the program code, thereby realizing the functions of the above embodiments.

In each embodiment described above, processing for image data has been described in detail. However, the present invention can be properly applied to processing for audio data.

The above description on each embodiment is mainly associated with the case in which a still image is coded or water-mark information is embedded in a still image. However, the present invention is not limited to this. If, for example, the above still image is regarded as one of a plurality of frames constituting a motion image, and each embodiment described above is applied to each frame, the motion image is coded or water-mark information is embedded in the motion image. The present invention includes such a case.

As has been described above, according to the present invention, when input data is subjected to compression processing and/or digital watermark information embedding processing, some circuits are shared between the compression processing means for compressing the input data and the embedding means for embedding digital watermark information in the input data within one apparatus. With this arrangement, example, since a converting unit can be shared between the digital watermark embedding device and the compression processing means, a multimedia data processing apparatus can be formed without increasing the circuit size.

In each embodiment, by inseparably integrating the compression processing means and the embedding means in one image processing board, in particular, the circuit size can be greatly reduced.

In addition, according to another characteristic feature of the present invention, since data processing suitable for the input image data can be performed, digital watermark information embedding processing and data compression processing can be performed for a general image including both a portion to be processed as a multivalue image and a portion to be processed as a binary image by effectively using the characteristics of these images. This allows processing while maintaining good image quality.

Furthermore, according to the present invention, whether to embed digital watermark information in input image data after it is compressed or to compress the data after digital watermark information is embedded in it can be selected. This allows proper image processing in consideration of the compatibility between the digital watermark information embedding scheme and the compression scheme.

What is claimed is:

1. A data processing apparatus comprising:
   input means for inputting digital data including at least one of image data and audio data;
   transforming means for transforming a data format of the digital data;
   compression means for compressing the digital data whose data format has been transformed by said transforming means;
   embedding means for embedding digital watermark information in the digital data whose data format has been transformed by said transforming means;
   first switching means for selectively outputting the digital data outputted from said transforming means to said embedding means or said compression means, said first switching means being connected after said transforming means and before said embedding means and said compression means; and second switching means for selectively outputting the digital data outputted from said embedding means to said compression means or an another destination, said second switching means being connected after said embedding means and before said compression means, wherein said apparatus includes a plurality of image processing modes, compresses the digital data by using said transforming means and said compression means in a first mode, and embeds digital watermark information in the digital data by using said transforming means and said embedding means in a second mode, and wherein said first switching means and said second switching means execute switching between the modes, the compressing is not executed on the digital data in the second mode, and the digital watermark information is not embedded in the digital data in the first mode.

2. An apparatus according to claim 1, wherein said transforming means, said compression means, and said embedding means are inseparably integrated.

3. An apparatus according to claim 1, wherein said transforming means, said compression means, and said embedding means are inseparably arranged in one image processing board.

4. An apparatus according to claim 1, wherein transforming of the data format includes any one of wavelet transforming, cosine transforming, and Fourier transforming.

5. An apparatus according to claim 1, wherein transforming of the data format includes predictive coding.

6. An apparatus according to claim 1, wherein the plurality of image processing modes further include a third mode, and both embedding of digital watermark information in the digital data and compression of the digital data are executed by using said transforming mean, said embedding means, and said compression means in the third mode.

7. An apparatus according to claim 1, wherein said compression means includes quantization means for quantizing the digital data whose data format has been transformed by said transforming means and entropy coding means for performing entropy coding of the quantized data.

8. An apparatus according to claim 1, wherein at least some of said transforming means, said compression means, and said embedding means constitute a media processor.

9. An apparatus according to claim 1, wherein the image data is motion image data.

10. A data processing apparatus, comprising:

input means for inputting digital data including at least one of image data and audio data;

transforming means for transforming a data format of the digital data;

compression means for compressing the digital data whose data format has been transformed by said transforming means;

embedding means for embedding digital watermark information in the digital data whose data format has been transformed by said transforming means; and selection means for selecting whether to embed digital watermark information in the digital data or compress the digital data first, wherein said apparatus includes a plurality of image processing modes, compresses the digital data by using said transforming means and said compression means in a first mode, and embeds digital watermark information in the digital data by using said transforming means and said embedding means in a second mode, and both embedding of digital watermark information in the digital data and compression of the digital data are executed by said transforming means, said embedding means, and said compression means in a third mode.

11. A data processing apparatus comprising:

input means for inputting digital data including at least one of image data and audio data;

transforming means for transforming a data format of the digital data;

compression means for compressing the digital data whose data format has been transformed by said transforming means; and embedding means for embedding digital watermark information in the digital data whose data format has been transformed by said transforming means, wherein said apparatus includes a plurality of image processing modes, compresses the digital data whose data format has been transformed by said transforming means, and then embeds digital watermark information in the compressed data in a first mode, and embeds digital watermark information in the digital data whose data format has been transformed by said transforming means, and then compresses the digital data in the second mode.

12. An apparatus according to claim 11, wherein transforming of the data format includes any one of wavelet transforming, cosine transforming, and Fourier transforming.

13. An apparatus according to claim 11, wherein said compression means includes quantization means for quantizing the digital data whose data format has been transformed by said transforming means, and entropy coding means for performing entropy coding of the quantized data.

14. An apparatus. according to claim 11, wherein at least some of said transforming means, said compression means, and said embedding means constitute a media processor.

15. An apparatus according to claim 11, wherein the image data is motion image data.

16. A data processing method comprising the steps of:

inputting digital data including at least one of image data and audio data;

transforming a data format of the digital data;

compressing the digital data whose data format has been transformed; and embedding digital watermark information in the digital data whose data format has been transformed, wherein the method includes a plurality of image processing modes, compresses the digital data whose data format has been transformed, and then embeds digital watermark information in the compressed data in a first mode, and embeds digital watermark information in the digital data whose data format has been transformed, and then compresses the digital data in the second mode.

17. A storage medium storing data processing method comprising the steps of:

inputting digital data including at least one of image data and audio data;

transforming a data format of the digital data;

compressing the digital data whose data format has been transformed; and embedding digital watermark information in the digital data whose data format has been transformed, wherein the method includes a plurality of image processing modes, compresses the digital data whose data format has been transformed, and then embeds digital watermark information in the compressed data in a first mode, and embeds digital watermark information in the digital data whose data format has been transformed, and then compresses the digital data in the second mode.

* * * * *

UNITED STATES PATENT AND TRADEMARK OFFICE
CERTIFICATE OF CORRECTION

PATENT NO.     : 6,434,253 B1
DATED          : August 13, 2002
INVENTOR(S)    : Junichi Hayashi et al.

It is certified that error appears in the above-identified patent and that said Letters Patent is hereby corrected as shown below:

Column 1,
Line 32, "a copyrights" should read -- copyrights --.

Column 2,
Line 3, "an digital" should read -- a digital --.

Column 3,
Line 31, "data - into" should read -- data into --; and
Lines 57 and 63, "an digital" should read -- a digital --.

Column 5,
Line 41, "an digital" should read -- a digital --.

Column 6,
Line 61, "exploited.  As" should read -- exploited. ¶As. --.

Column 7,
Line 33, "an digital" should read -- a digital --.

Column 8,
Line 28, "qual" should read -- equal --; and
Line 67, "An digital" should read -- A digital --.

Column 9,
Line 30, "an digital" should read -- a digital --;
Line 33, "an" should read -- and --;
Line 55, "theswitching" should read -- the switching --.

Column 10,
Line 3, "the-switching" should read -- the switching --;

Column 11,
Line 10, "an digital" should read -- a digital --.

UNITED STATES PATENT AND TRADEMARK OFFICE
CERTIFICATE OF CORRECTION

PATENT NO.   : 6,434,253 B1
DATED        : August 13, 2002
INVENTOR(S)  : Junichi Hayashi et al.

It is certified that error appears in the above-identified patent and that said Letters Patent is hereby corrected as shown below:

<u>Column 12,</u>
Line 29, "example," should read -- for example, --.

Signed and Sealed this

Seventh Day of October, 2003

JAMES E. ROGAN
*Director of the United States Patent and Trademark Office*